United States Patent
Edwards (10) Patent No.: US 12,098,317 B2
(45) Date of Patent: Sep. 24, 2024

(54) STRAW-BASED COMPOSITION

(71) Applicant: PROFILE PRODUCTS LLC, Buffalo Grove, IL (US)

(72) Inventor: Ronald Charles Edwards, Worley, ID (US)

(73) Assignee: PROFILE PRODUCTS LLC, Buffalo Grove, IL (US)

(*) Notice: Subject to any disclaimer, the term of this patent is extended or adjusted under 35 U.S.C. 154(b) by 169 days.

(21) Appl. No.: 17/829,457

(22) Filed: Jun. 1, 2022

(65) Prior Publication Data

US 2022/0380671 A1 Dec. 1, 2022

Related U.S. Application Data

(60) Provisional application No. 63/195,234, filed on Jun. 1, 2021.

(51) Int. Cl.
*C09K 17/52* (2006.01)
*A01G 13/02* (2006.01)

(52) U.S. Cl.
CPC .......... *C09K 17/52* (2013.01); *A01G 13/0262* (2013.01)

(58) Field of Classification Search
CPC .......... A01G 13/0262; A01G 2013/008; A01G 13/00; C09K 17/52
USPC ................................................. 504/100, 114
See application file for complete search history.

(56) References Cited

U.S. PATENT DOCUMENTS

| 6,408,568 | B1* | 6/2002 | Kusey | C09K 17/52 |
| | | | | 47/9 |
| 10,266,457 | B2* | 4/2019 | Spittle | C09K 17/32 |
| 2009/0038216 | A1* | 2/2009 | Kim | A01G 24/15 |
| | | | | 47/58.1 SC |
| 2015/0068115 | A1* | 3/2015 | Loucks | A01C 21/00 |
| | | | | 47/9 |

FOREIGN PATENT DOCUMENTS

| AU | 2013322298 A1 * | 4/2015 | ............ B65D 65/38 |
| CN | 105036860 A | 11/2015 | |
| CN | 106831152 A | 6/2017 | |
| CN | 111116250 A | 5/2020 | |
| CN | 111972257 A | 11/2020 | |
| JP | 2007295882 A * | 11/2007 | |
| WO | WO-0232210 A1 * | 4/2002 | ............... A01C 1/00 |

* cited by examiner

*Primary Examiner* — Brady W Frazier
*Assistant Examiner* — Spencer T Callaway
(74) *Attorney, Agent, or Firm* — BROOKS KUSHMAN P.C.

(57) ABSTRACT

A mulch composition includes a blend of about 50-85 wt. % fibrous straw, based on the total weight of the composition; about 10-30 wt. % refined pulp fibers, based on the total weight of the composition; and about 10-40 wt. % fibrous wood components, based on the total weight of the composition, the blend having about 10-15 wt. % of particles having particle size of 2360 μm or greater.

8 Claims, 7 Drawing Sheets

STRAW-BASED COMPOSITION

CROSS REFERENCE TO RELATED APPLICATIONS

This application claims the benefit of U.S. application Ser. No. 63/195,234 filed Jun. 1, 2021, the disclosure of which is incorporated in its entirety by reference herein.

TECHNICAL FIELD

The present disclosure is related to a straw-based composition including a blend of fibrous straw, refined pulp fibers, and fibrous wood components, and methods of making and using the same as a mulch, erosion control composition, seed establishment composition, or growing medium.

BACKGROUND

Mulch is useful for improving moisture retention, suppressing the growth of weeds thereby improving plant growth, regulating soil temperature, and preventing soil erosion. Organic mulch also delivers nutrients to the soil, which improves the health of the soil, further aiding plant growth. Organic mulch, traditionally made from wood chips and other components such as bark, sawdust, or pine needles, has been used to prevent soil erosion. Uncontrolled erosion can result in environmental damage including flooding of surrounding areas, pollution of rivers and lakes, and/or injury to plant and animal life. Erosion also results in loss of fertile topsoil which reduces chances of vegetation survival and increases the erosion cycle.

SUMMARY

In one or more embodiments, a mulch composition is disclosed. The mulch composition includes a blend of about 50-85 wt. % fibrous straw, based on the total weight of the composition; about 10-30 wt. % refined pulp fibers, based on the total weight of the composition; and about 10-40 wt. % fibrous wood components, based on the total weight of the composition. The blend may have about 10-15 wt. % of particles having particle size of 2360 μm or greater. The fibrous wood components may be hammermilled. The fibrous straw may include wheat straw. The fibrous straw may include Kentucky blue grass straw, alfalfa, or both. The composition may include about 7-10 wt. % of particles having a size sufficient to remain on sieve 100. The fibrous wood components may include a surfactant. The composition may further include at least one of fertilizer(s), macronutrient(s), micronutrient(s), mineral(s), binder(s), natural gum(s), interlocking fiber(s), biostimulant(s), ceramic particle(s), and combinations thereof. The composition may include about 65-75 wt. % fibrous straw, about 15-25 wt. % refined pulp fibers, and about 15-25 wt. % fibrous wood components, based on the total weight of the composition.

In another embodiment, a blended mulch composition is disclosed. The composition includes about 50-85 vol. % fibrous straw; about 10-30 vol. % refined pulp fibers; and about 10-40 vol.% fibrous wood components, based on the total volume of the composition. The composition may have a pH of about 5 to 6.5. The composition may have electrical conductivity greater than about 0.55 mmhos/cm. The fibrous wood components may be hammermilled. The fibrous straw may include wheat straw. The fibrous wood components may include a surfactant. The blended mulch composition may also include at least one of fertilizer(s), macronutrient(s), micronutrient(s), mineral(s), binder(s), natural gum(s), interlocking fiber(s), biostimulant(s), ceramic particle(s), and combinations thereof. The composition may have a higher percentage of particles on sieve #16 than on sieve #8.

In yet another embodiment, a hydraulic mulch composition is disclosed. The composition may include a blend of fibrous straw, refined pulp fibers, and fibrous wood components in a ratio of about 5:1:1 to 8.5:3:4, the blend having a density of about 5-7 lb/ft$^3$. The composition may have electrical conductivity greater than about 0.55 mmhos/cm. The hydraulic mulch composition may also include a surfactant, a dye, or both. The wood components may be hammermilled. The pH may be above about 5. The fibrous straw may include wheat straw.

DETAILED DESCRIPTION

As required, detailed embodiments of the present invention are disclosed herein; however, it is to be understood that the disclosed embodiments are merely exemplary of the invention that may be embodied in various and alternative forms. The figure is not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the disclosure. Practice within the numerical limits stated is generally preferred. Also, unless expressly stated to the contrary: percent, "parts of," and ratio values are by weight; the description of a group or class of materials as suitable or preferred for a given purpose in connection with the disclosure implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the disclosure can be obtained within a range of +/−5% of the indicated value. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . , 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. Similarly, whenever listing integers are provided herein, it should also be appreciated that the listing of integers explicitly includes ranges of any two integers within the listing.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

As used herein, the term "and/or" means that either all or only one of the elements of said group may be present. For example, "A and/or B" means "only A, or only B, or both A and B". In the case of "only A," the term also covers the possibility that B is absent, i.e. "only A, but not B".

It is also to be understood that this disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

The term "growing medium" (GM) refers to a substrate, specifically a soil-free substrate or a substrate with soil, or a combination of materials used to provide physical support, water retention, aeration, and/or nutrient supply for plant growth so that a plant can establish its root system within the growing medium and allow for root growth, as the roots grow in spaces between individual particles of the growing medium.

The term "mulch" or "mulch composition" as used herein means a layer of fibrous material that is applied to a soil to reduce erosion, to improve water retention, and/or to hold a seed in place on the soil surface long enough for the seed to germinate and for the root to develop within the soil below the mulch. Hydraulic mulches are mulches applied by spraying with water through a hydraulic seeder or similar device.

The term "hammermilled" as used herein means for a substance, including, but not limited to, fibrous wood components or fibrous straw components, to be subjected to a machine called a hammermill. The hammermill grinds the materials to produce particles of reduced size. The material to be hammermilled enters the grinding chamber of the hammermill and is split into smaller particles by the rotation of the hammers and the grinding bridge. The particles produced by grinding are expelled through a screen with openings of a selected size and shape. The hammermill can be fitted with various screen and hammer combinations to achieve the desired particle size. Additionally, hammermills can be screenless, in which case smaller particles are separated from larger ones using airflow.

The term "fiberizer" as used herein means a plate or disc grinder used to rupture a substance including, but not limited to, fibrous straw or fibrous wood components. The plates of the fiberizer rotate and grind to reduce the size of the fibers and open the fibers to create increased surface area.

The understanding that land use by humans affects the health and utility of soil predates modern nations. Plato and Aristotle both postulated that deforestation of Greek hillsides led to soil erosion and consequently deterioration of the health of the soil. Modern soil studies in the region confirmed their theories, linking significant erosion events not to the drastic climate change of the last glaciation, but to the introduction of farming. The existence of ancient erosion control measures such as terraced hillsides on virtually every inhabited continent further suggest that ancient peoples understood the importance of preserving soil.

In the 1920's, Hugh Hammond Bennett, nicknamed the "father of soil conservation," pushed the United States Congress to begin studying the effects of erosion and the importance of soil preservation. The dust bowl crisis of 1932 cemented the necessity for preserving soil in the minds of Americans and prompted the New Deal administration to focus on soil conservation, passing the Soil Conservation Act of 1935. Since then, numerous soil conservation measures have been implemented to control erosion in various sectors including farming, construction, and highway embankment design.

Recently, the effects of climate change such as extreme weather patterns, fires, mudslides, overpopulation, and insensitive industrial decisions have accelerated erosion problems around the globe. For example, dust plumes generated by wind erosion from the Sahara Desert are increasingly traveling beyond the Mediterranean Sea into Southern Europe, and even as far as the Gulf Coast of the United States. The Western part of the United States, Australia, and other arid and semi-arid areas are similarly experiencing unprecedented erosion rates. Additionally, areas with no lack of water and precipitation, such as the Great Lakes region and deforested areas of Asian countries are being forced to tackle new erosion problems associated with loss of land due to landslides, river and lake bank erosion, etc. Thus, there is a significant interest and incentive to stop, prevent, and where possible, reverse erosion.

Any soil that is not covered may be susceptible to erosion by wind and water. Farmland is particularly susceptible to erosion due to the deforestation and clearing necessary to grow specific crops. Erosion on farmland is detrimental to crops, as disturbing topsoil reduces organic matter in the soil, decreases rooting depth, and affects the amount of nutrients, water and air available to plants. In addition to lowering crop yield, nutrient and sediment run off can pollute rivers and lakes causing flooding of surrounding areas and injury to plants and animals. Additionally, dust generated by wind erosion can reduce air quality and negatively impact human and animal health. Farmers utilize various methods of erosion control including crop rotation, cover crops, grassed waterways, and mulching.

Construction sites are another major contributor to soil erosion in part because the land must be cleared for construction to begin, but also because topsoil is physically removed or altered to dig basements, grade sites, or fill sites. Developers prevent erosion control by utilizing physical barriers (i.e. rocks, concrete blocks, earth walls), but also by establishing vegetation at the site using seeds and mulch.

There are several categories of mulch, for example organic and inorganic. Organic mulch may be composed of previously living components such as grass, wood, compost, or manure. Inorganic mulch may be made from synthetic components such as plastics, landscape fabrics, or rocks. Polyethylene plastic is becoming a popular inorganic mulch in agriculture. While inorganic mulches do not have to be replaced as often, they do not perform as well in terms of protecting plants from temperature fluctuations or retaining moisture. They also do not deliver nutrients to the soil and can actually prevent nutrients from reaching the soil. Additionally, most plastic materials are made unsustainably and may not be biodegradable. Yet, there is a demand for a mulch composition with improved performance, easier mixing, loftier matrix, and improved coverage, which would be also environmentally friendly.

In one or more embodiments, a straw-based composition or mulch composition or growing medium composition is disclosed. The straw-based composition, also referred to as a composition herein, may include fibrous straw, refined pulp fibers, and fibrous wood components. The composition may include additional components discussed below. The composition may be used as a growing medium, mulch, erosion prevention composition, erosion control composition, seed establishment composition, dust suppression composition, the like, or a combination thereof.

The fibrous straw, refined pulp fibers, and wood components may be all milled to size, examples of which are shown in Tables 1 and 2. The fibrous straw, refined pulp fibers, and wood components may be hammermilled. The composition may be made by a method wherein the individual components (i.e., the fibrous straw, refined pulp fibers, and fibrous wood components) are combined together to form an initial composition which is then hammermilled. One or more of the components may be hammermilled before being combined with any of the other components. Hammermilling may impart unique desirable properties to the fibers. For example, hammermilling may rupture the fibers, thus creating better entanglement of the fibers. The shaft, leaves, and stems of the raw fibers, mechanically ruptured by the hammermilling, have a greater surface area compared to non-hammermilled straw fibers. The hammermilling straw also is more malleable compared to the non-hammermilled straw fibers, which is beneficial for slurry solutions.

The composition may include about 50-85, 55-80, or 60-75 wt. or vol % fibrous straw. The composition may include about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85 wt. or vol % of fibrous straw.

The composition may include about 10-30, 12-25, or 15 or 22 wt. or vol. % of refined pulp fibers. The composition may include about 10, 11, 12, 13, 14, 15, 16, 17, 18, 19, 20, 21, 22, 23, 24, 25, 26, 27, 28, 29 or 30 wt. or vol. % of refined pulp fibers.

The composition may include about 10-40, 12-25, or 15 or 22 wt. or vol. % wood components. The composition may include about 10, 11, 12, 13, 14, 5, 16, 17, 18, 19, 20, 21, 22, 23, 24, 25, 26, 27, 28, 29, 30, 31, 32, 33, 34, 35, 36, 37, 38, 39 or 40 wt. or vol. % of fibrous wood components.

In a non-limiting example, the composition may include about 50 to about 85 wt. or vol % of fibrous straw mixed with about 10 to about 30 wt. or vol % of refined pulp fibers and about 5 to about 30 wt. or vol % wood components, based on the total weight or volume of the composition. The composition may include about 55 to about 75 wt. or vol % fibrous straw mixed with about 15 to about 25 wt. or vol % of refined pulp fibers and about 10 to about 20 wt. or vol % wood components, based on the total weight or volume of the composition. The composition may include about 65 wt. or vol % of fibrous straw mixed with about 20 wt. or vol % of refined pulp fibers and about 15 wt. or vol % wood components, based on the total weight or volume of the composition.

The ratio of the components in the composition may be about 4:1:1 to 8.5:3:4, straw:pulp:wood. The ratio of the straw:pulp:wood in the composition may be about 4:1:1, 4:1:1.5, 5:1:1, 5:1:2, 6:1:1, 6:1:2, 7:2:2, 7:1:2, 7:2:3, 8:2:3, 8:3:4, 8.5:3:3, or 8.5:3:4. Non-limiting example ratios may include ratios of 27:8:7 straw:pulp:wood or 13:4:3 straw:pulp:wood.

The composition may include an equal amount of the refined pulp fibers and wood components. The fibrous straw may form a majority, by weight or volume, of the composition. The wood components or the refined pulp fibers may form the smallest portion, by weight or volume, of the composition. The composition may include around 1.25, 1.5, 1.75, 2, 2.5, 2.75, 3, 3.25, 3.5, 3.75, 4, or more times the amount of the fibrous straw than the refined pulp fiber and/or fibrous wood components.

Non-limiting examples of particle size distribution of the composition and the raw components are shown below in Table 1 and 2. The grams are based on 50 gram samples in both Tables 1 and 2.

TABLE 1

Particle distribution of the composition disclosed herein and its three main initial components

| | | Final Blend | Initial Components | | |
|---|---|---|---|---|---|
| Type of Material [100 vol. %] | | Straw-based composition | Fibrous wood components | Refined pulp fibers | Fibrous straw |
| Sieves [Mesh/μm] | Particle Range [mm] | Particle Distribution [%/g] | Particle Distribution [%/g] | Particle Distribution [%/g] | Particle Distribution [%/g] |
| #8/2360 | 2.36-4.74 | 12.06/5.99 | 43.34/21.33 | 92.69/46.14 | 82.12/40.37 |
| #16/1180 | 1.18-2.35 | 29.67/14.73 | 16.64/8.19 | 0.34/0.17 | 10.41/5.12 |
| #25/710 | 0.71-1.17 | 23.97/11.90 | 12.78/6.29 | 1.33/0.66 | 3.84/1.89 |
| #50/300 | 0.3-0.7 | 19.84/9.85 | 14.34/7.06 | 3.15/1.57 | 2.89/1.42 |
| #100/150 | 0.15-0.29 | 8.66/4.30 | 7.35/3.62 | 1.45/0.72 | 0.53/0.26 |
| Pan/<150 | <0.15 | 5.80/2.88 | 5.55/2.73 | 1.04/0.52 | 0.20/0.10 |

TABLE 2

Particle distribution of the composition disclosed herein and its three main initial components

| | | Final Blend | Initial Components | | |
|---|---|---|---|---|---|
| Type of Material [100 vol. %] | | Straw-based composition | Fibrous wood components | Refined pulp fibers | Fibrous straw |
| Sieves [Mesh/μm] | Particle Range [mm] | Particle Distribution [%/g] | Particle Distribution [%/g] | Particle Distribution [%/g] | Particle Distribution [%/g] |
| #8/2360 | 2.36-4.74 | 10-15/4.5-8 | 39-48/17-26 | 80-99/36-49 | 73-91/32-49 |
| #16/1180 | 1.18-2.35 | 26-33/11-18 | 15-19/6-10 | 0.3-0.4/0.1-0.2 | 9-12/4-7 |
| #25/710 | 0.71-1.17 | 21-27/9-15 | 11-15/5-8 | 1.2-1.5/0.5-1 | 3-5/1.5-2.5 |
| #50/300 | 0.3-0.7 | 17-22/7-12 | 12-16/5-10 | 2-5/1-2 | 2-4/1-2 |
| #100/150 | 0.15-0.29 | 7-10/3-4 | 6-9/2-5 | 1.3-1.8/0.5-0.9 | 0.4-0.6/0.2-0.4 |
| Pan/<150 | <0.15 | 5-7/2-4 | 5-7/2-4 | 0.9-2/0.4-0.7 | 0.1-0.3/0.05-0.2 |

The above ranges may be arrived at by testing a sample in a ROTAP testing procedure. A suitable ROTAP testing procedure uses a stacking of sieves in the follow order from top to bottom: #8, #16, #25, #50, #100, pan. Fifty grams of a fiber sample is then measured out from a primary specimen and placed on the top screen of the sieve stack, and the sieve stack is placed into the ROTAP and secured. The ROTAP timer is set for roughly five minutes, and then the process is started by pressing the START/RESUME button. When the ROTAP stops, the stack of sieves is removed, the fibers in each sieve are collected and weighed, and the results are documented.

The composition may include about 10-15, 11-14, or 12-13 wt. % of particles on sieve #8 or particles equal and/or greater than 2360 μm. The composition may include about 26-33, 27-32, or 28-30 wt. % of particles on sieve #16 or particles measuring 1.18-2.35 mm. The composition may include about 21-27, 22-26, or 12-25 wt. % of particles on sieve #25 or particles measuring 0.71-1.17 mm. The composition may include about 17-22, 18-21, or 19-20 wt. % of particles on sieve #50 or particles measuring 0.3-0.7 mm. The composition may include about 7-10, 7.5-9.5, or 8-8.5 wt. % of particles on sieve #100 or particles measuring 0.15-0.29 mm. The composition may include about 5-7, 5.2-6.8, 5.5-6 wt. % of particles on the pan or particles smaller than 150 μm.

The composition includes fibrous straw. The term fibrous straw may include, but is not limited to, wheat straw or Kentucky Bluegrass straw. The fibrous straw may in addition, or in the alternative, include grass seed, cereal grains, rice, timothy, grass hay, soybeans, kenaf, alfalfa, other grass, other hay, and/or combinations thereof. The straw may be wheat straw, and in particular a hammermilled wheat straw. The straw may be a fine lawn grass straw separated from lawn seed and hammermilled to sizes of about 6-13, 6.5-12.5, or 7-12 mm, and preferably abraded to partially release fibers for entanglement.

The term refined pulp fibers may include, but is not limited to, paper particles, fluff pulp fibers, reclaimed SAM fluff pulp mix fibers, cellulose pulp fibers, recycled paper, recycled newsprint, and/or cellulose fibers. It should be understood that the terms "particles" and "fibers" can be used interchangeably, unless stated to the contrary or is entirely evident from the context.

The refined pulp fibers may include fibers of cellulose pulp, sodium polyacrylate, absorbent polymers such as carboxy methyl cellulose.

The term fibrous wood components may include, but is not limited to, fibrous wood. The term "fibrous wood" refers to wood chips, wood fiber, bark, needles, or their combination. The fibrous wood may be derived from coniferous and deciduous trees. Any type of fibrous wood may be used, for example the softwood varieties such as yellow poplar, cedar such as Western red cedar, fir such as Douglas fir, California redwood, and particularly pine such as Ponderosa, Sugar, White, and Yellow varieties. For example, fibrous wood may refer to fibrous pine tree wood components including just fibrous pine tree wood or fibrous pine tree wood as well as fibrous tree bark, needles, chips, or a combination thereof. The fibrous wood components are bark free or substantially bark free.

In at least one embodiment, the fibrous wood contains about 100 wt. or vol. % wood, based on the total weight or volume of the fibrous wood components. The fibrous wood may contain about 0-30, 1-25, or 5-20 wt. or vol. % bark, based on the total weight or volume of the fibrous wood components. More than about 30 wt. or vol. % bark in the fibrous wood component may affect the water holding capacity of the composition such that the water holding capacity may not be as high as when less than 30 wt. or vol. % bark is added. More than about 30 wt. or vol. % bark may also affect the efficiency of hydraulic application of the composition.

The fibrous wood components may further include a non-permanent dye that is eventually removed or that eventually fades after the composition is applied. Preferably, the non-permanent dye is non-toxic so that no toxic chemicals are leached from the composition into the environment. The non-permanent dye may include natural and/or synthetic compounds. The non-permanent dye may include compounds derived from plants, fungi, lichens, invertebrates, insects, minerals, the like, or a combination thereof. Any part of the plant may be utilized to provide the dye such as roots, petals, leaves, stems, shoots, stalks, hulls, husks, ripe and/or unripe fruit, or seed. Exemplary sources of plant dyestuffs include tree varieties named above; vegetables such as carrots, beetroot, red cabbage, artichoke, spinach, celery; fruit such as blueberries, pomegranate, strawberries, avocado, cherries, raspberries, mulberries, elderberries, blackberries, grapes, peach; turmeric, fennel, basil, paprika, saffron, tea plants, coffee plants, barberry, bloodroot, lilac, coneflower, dandelion, goldenrod, hollyhock, ivy, St John's Wort, yellow dock, rose, lavender, cornflower, hyacinth, Queen Anne's Lace, hibiscus, daylily, safflower, camellia, snapdragon, nettle, milkweed, peony, Black-eyed Susan, hydrangea, chamomile, alfalfa, crocus, marigold, or the like. Exemplary mineral-based dyestuffs include iron oxide and carbon black. A non-limiting example type of non-permanent dye may include green pigments.

The fibrous wood components may additionally include at least one type of surfactant.

The fibrous wood components are processed wood components. The process may include at least one of heating, moisturizing, drying, pressurizing, refining, fiberizing, opening, compressing, sizing, dyeing, surfactant inclusion, or a combination thereof. The wood components may be hammermilled, non-hammermilled, or a combination thereof. The fibrous wood components may have specific particle distribution shown in Tables 1 and 2, and/or the particle distribution disclosed herein. The wood components may have a different particle distribution than the wood/bark fiber in the comparative examples below.

The wood components may include fibers characterized by having about 35-50, 38-48, or 40-46% per 10 g of material on sieve 8. The wood components may include fibers characterized by having about 15-19, 15.5-18.5, or 16-18% per 10 g of material having a size sufficient to remain on sieve 16. The wood components may include fibers characterized by having about 11-15, 11.5-14.5, or 12-14% per 10 g of material having a size sufficient to remain on sieve 25. The wood components may include fibers characterized by having about 12-16, 12.5-15.5, or 13-15% per 10 g of material having a size sufficient to remain on sieve 50. The wood components may include fibers characterized by having about 7-10, 7.5-9.5, or 8-9% per 10 g of material having a size sufficient to remain on sieve 100. The wood components may include fibers characterized by having about 5-7, 5.2-6.8, or 5.5-6.5% per 10 g of material having a size sufficient to remain on the pan.

The composition may be combined with additional components. Examples of such additional components include, but are not limited to, fertilizer(s), macronutrient(s), micronutrient(s), mineral(s), binder(s), natural gum(s), interlocking manmade fiber(s), biodegradable interlocking fiber(s), biostimulant(s), paper, compost, manure, sawdust, ceramic particles, and the like, and combinations thereof. In general, these additional components in total may be present in an amount of less than about 10 wt. or vol. % of the total weight or volume of the composition. The additional components in total may be present in an amount of about 1-20, 2-18, or 5-15 wt. or vol. % of the total weight or volume of the composition. The composition may be free of at least one of fertilizer(s), macronutrient(s), micronutrient(s), mineral(s), binder(s), natural gum(s), interlocking manmade fiber(s), biodegradable interlocking fiber(s), biostimulant(s), paper, compost, manure, sawdust, ceramic particles, and the like, Additionally, soil may be present in an amount of about 1-20, 3-18, or 4-15 wt. or vol. %, based on the total weight or volume of the composition. The soil may be present in an amount of less than about 20, 15, or 10 wt. or vol. %, based on the total weight or volume of the composition. Soil may be absent from the composition.

Fertilizers such as nitrogen fertilizers, phosphate fertilizers, potassium fertilizers, compound fertilizers, and the like may be used in a form of granules, powder, prills, or the like. For example, melamine/formaldehyde, urea/formaldehyde, urea/melamine/formaldehyde and like condensates may serve as a slow-release nitrogenous fertilizer. Fertilizers may include slow release and/or control release fertilizers having polyolefin, polyurethane, or biodegradable coating. Fertilizers having lesser nutritional value, but providing other advantages such as improving aeration, water absorption, or being environmental-friendly may be used. The source of such fertilizers may be, for example, animal waste, plant waste, manure, compost, or a combination thereof.

Nutrients are well-known and may include, for example, macronutrient, micronutrients, and minerals. Examples of macronutrients include calcium, chloride, magnesium, phosphorus, potassium, and sodium. Examples of micronutrients are also well-known and include, for example, boron, cobalt, chromium, copper, fluoride, iodine, iron, magnesium, manganese, molybdenum, selenium, zinc, vitamins, organic acids, and phytochemicals. Other macro- and micronutrients are well known in the art.

The binders may be natural or synthetic. For example, the synthetic binders may include a variety of polymers such as addition polymers produced by emulsion polymerization and used in the form of aqueous dispersions or as spray dried powders. Examples include styrene-butadiene polymers, styrene-acrylate polymers, polyvinylacetate polymers, polyvinylacetate-ethylene (EVA) polymers, polyvinylalcohol polymers, polyacrylate polymers, polyacrylic acid polymers, polyacrylamide polymers and their anionic- and cationic-modified copolymer analogs, i.e., polyacrylamide-acrylic acid copolymers, and the like. Powdered polyethylene and polypropylene may also be used. When used, synthetic binders are preferably used in aqueous form, for example as solutions, emulsions, or dispersions. While binders are not ordinarily used in growing media, they may be useful in hydraulically applied growing media or mulches.

Thermoset binders may also be used, including a wide variety of resole and novolac-type resins which are phenol/formaldehyde condensates, melamine/formaldehyde condensates, urea/formaldehyde condensates, and the like. Most of these are supplied in the form of aqueous solutions, emulsions, or dispersions, and are generally commercially available.

The natural binder may include a variety of starches such as corn starch, modified celluloses such as hydroxyalkyl celluloses and carboxyalkyl cellulose, or naturally occurring gums such as guar gum, gum tragacanth, and the like. Natural and synthetic waxes may also be used.

Biostimulants may include any substance or microorganism that, when applied to seeds or plants, stimulates natural processes to enhance or benefit nutrient update, nutrient use efficiency, and/or crop quality and yield. Biostimulants may include many different types. Non-limiting example biostimulants include enzymes, proteins, amino acids, protein hydrolases and/or other N-containing compounds, micronutrients such as Al, Co, Na, Se and Si, phenols, salicylic acid, humic acid, fulvic acid, seaweed extract, botanicals, biopolymers such as chitosan, inorganic compounds such as amorphous silica ($SiO_2.nH_2O$), microbial biostimulants including mycorrhizal and non-mycorrhizal fungi, bacterial endosymbionts (like *Rhizobium*) and Plant Growth-Promoting Rhizobacteria, fungi, etc.

Ceramic particles may include calcined particles. The calcined particles may be based on clay. The calcined clay particles may include one or more types of clay. The clay may include, for example, smectite clay(s) including the following minerals: montmorrilonite, beidellite, nantronite, saponice, hectorite. The clay may be gray, red, or both. The clay particles may be processed in the following manner for the purposes of the disclosed application. The clay may be calcined at a temperature of about 1000 to 1400, 1100 to 1350, or 1200 to 1300° F. or 537-760, 593-732, or 648-704° C. The clay may be subsequently sized or micronized, for example, by grinding. The clay may be provided in various sizes. The heat-treated mineral particles may be added to the hydroponic substrate pre- or post-compression. Additional particles may include perlite, vermiculite, sand particles, zeolite, hydrated aluminosilicate minerals that contain alkali and alkaline-earth metals, or a combination thereof. The mineral particle(s) may be treated or untreated.

Figure 2A:
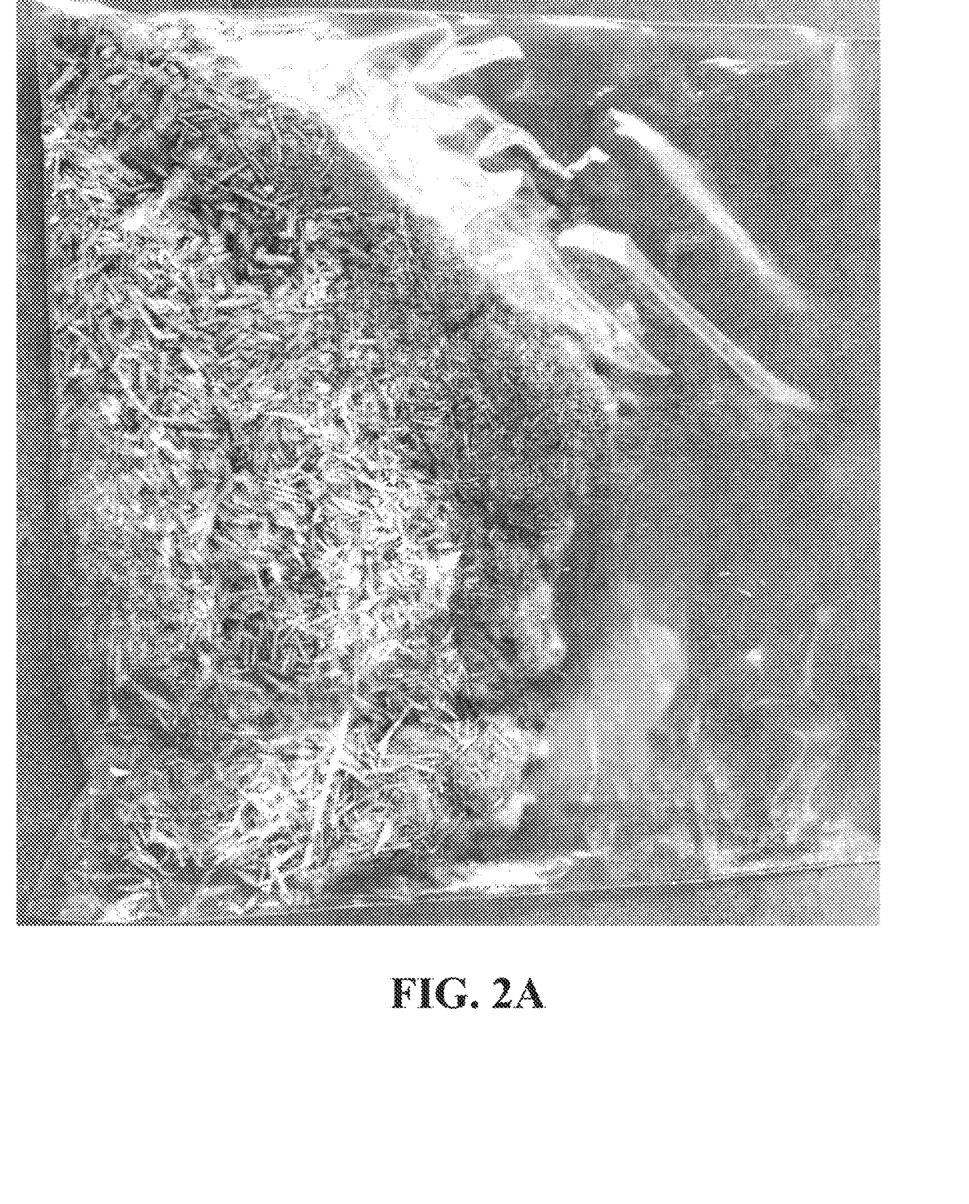
FIGS. 2A and 2B are photographic images of non-limiting examples of the composition disclosed herein.
Figure 2B:
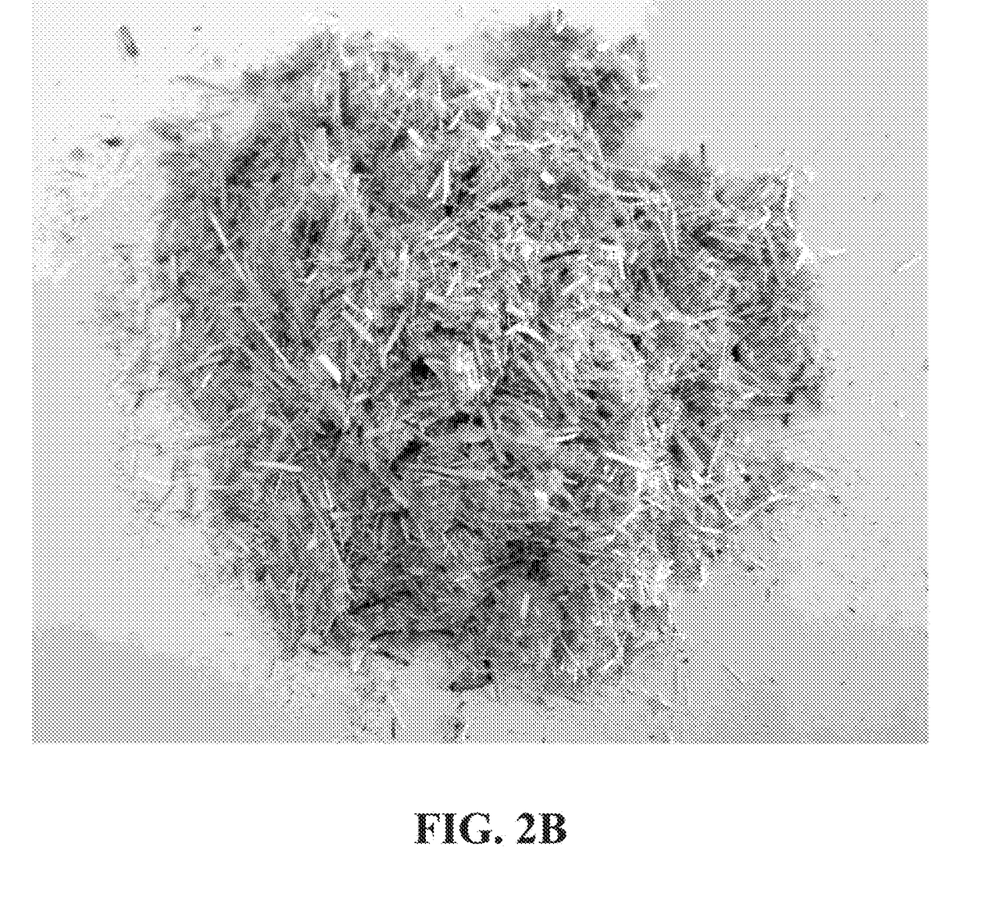
Figure 3:
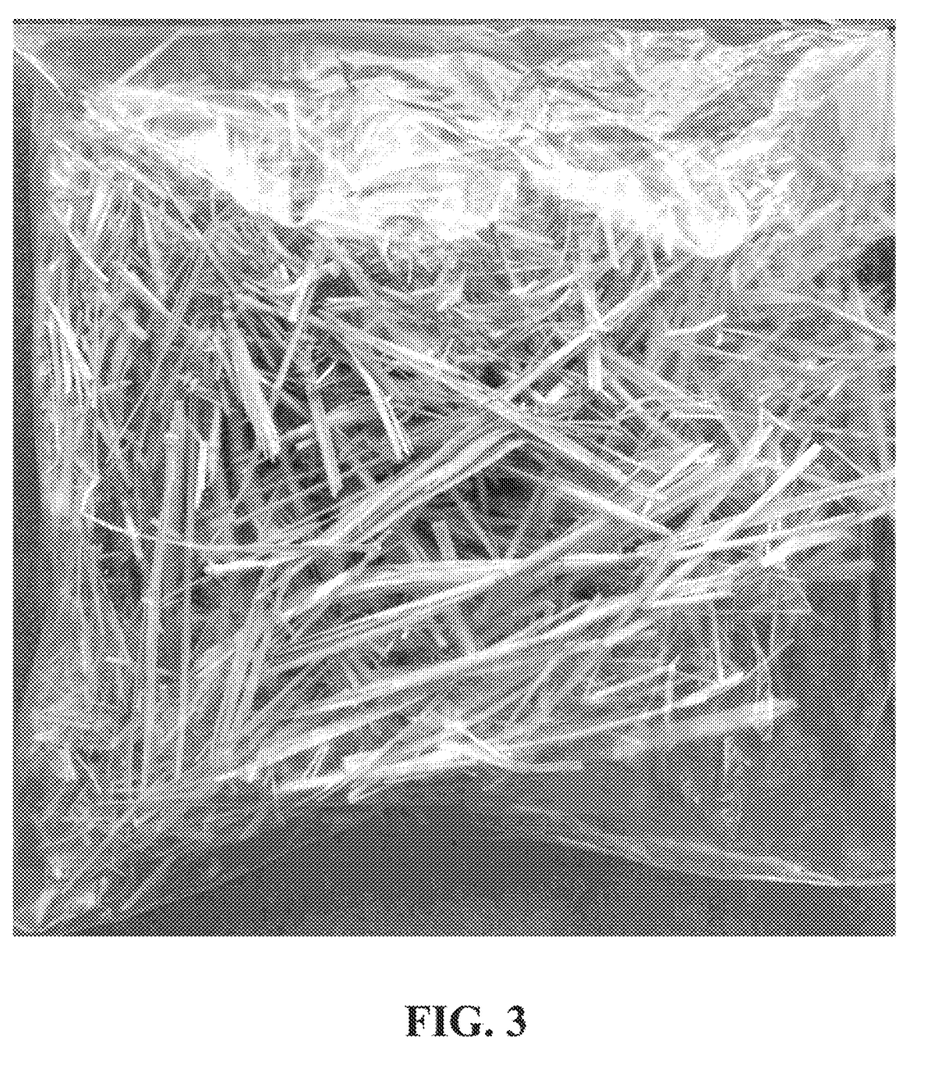
FIGS. 3-5 are photographic images of non-limiting examples of individual components the herein-disclosed composition is made from: the fibrous straw in FIG. 3, the refined pulp fiber in FIG. 4, and the fibrous wood components in FIG. 5, respectively.
Figure 4:
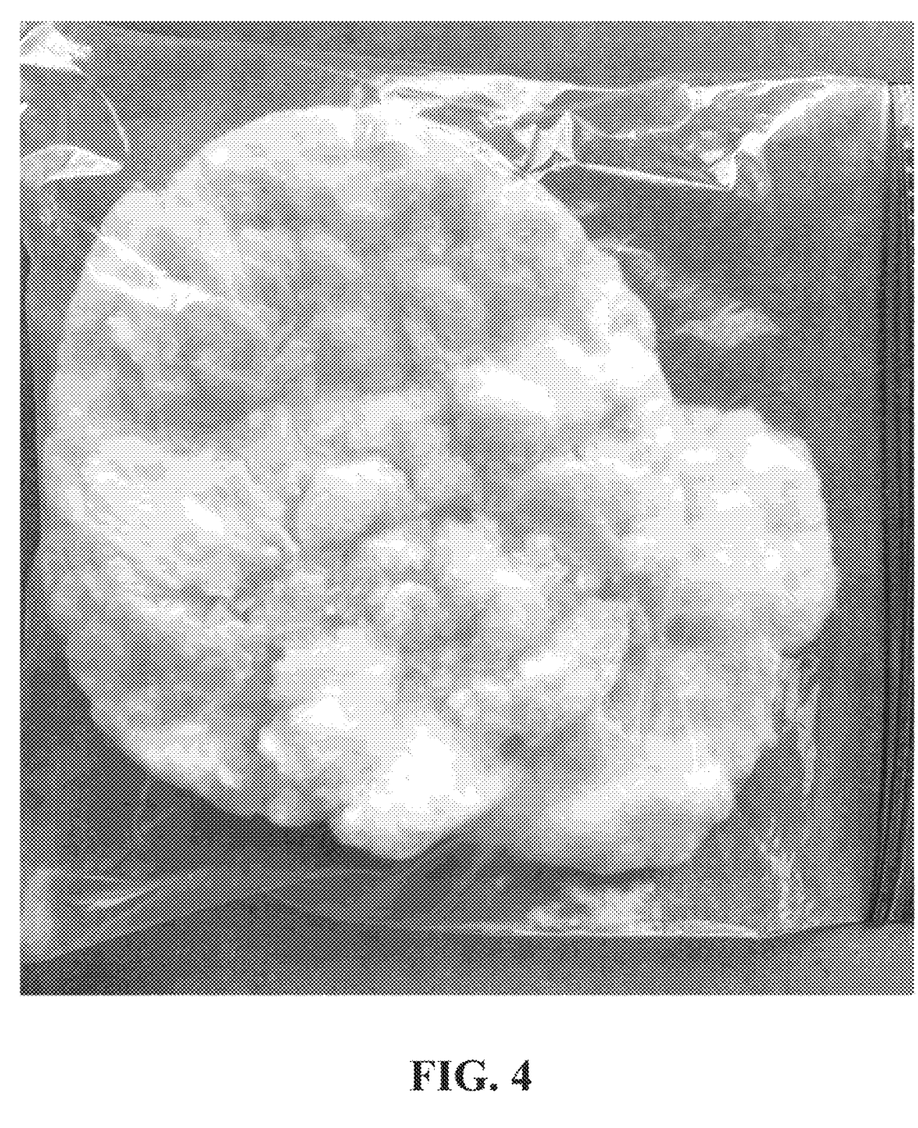
Figure 5:
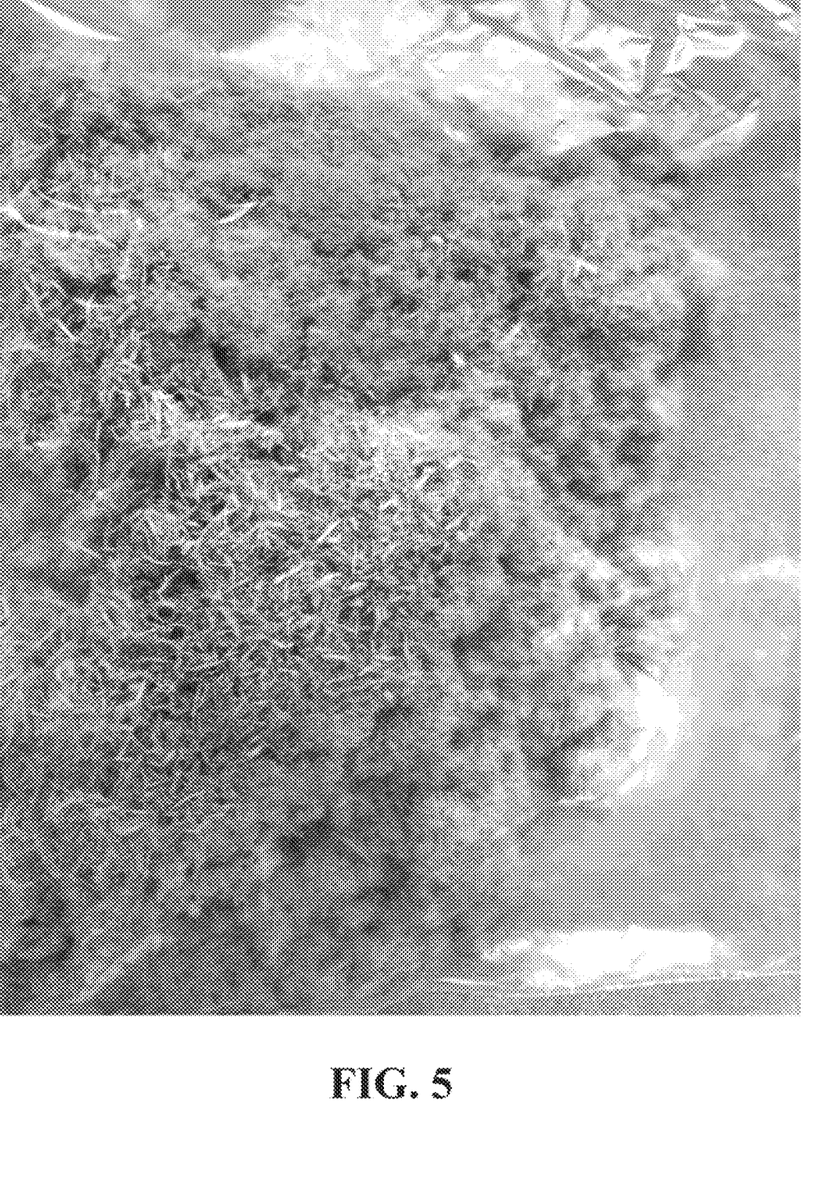
Figure 6:
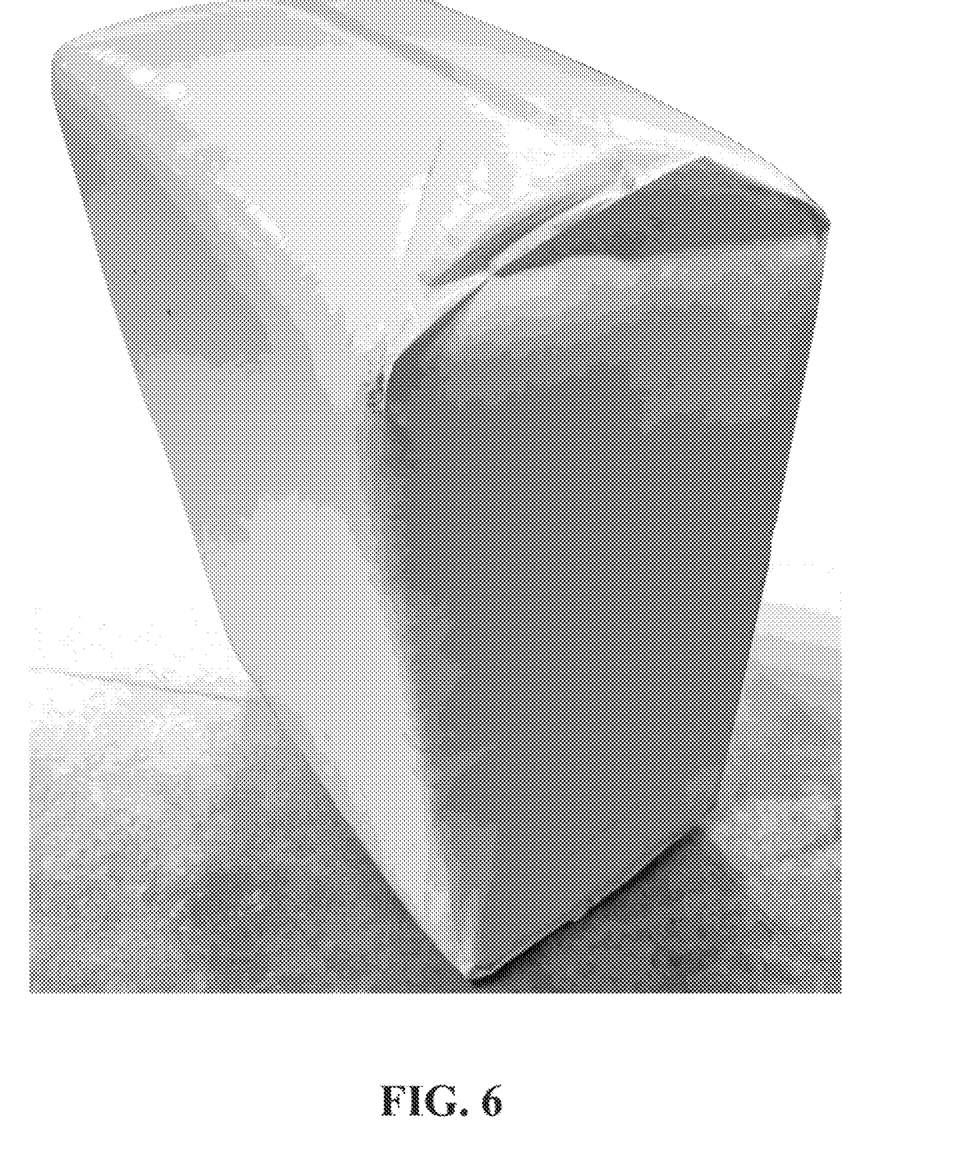
FIG. 6 is a photograph of a bale of the composition of the present disclosure.

The composition may be made by the following process. The initial components (i.e., at least the fibrous straw, refined pulp fibers, and fibrous wood components) are combined together and then milled to size. Combining may mean placing on top of each other, mixing, blending, or a combination thereof. The combined components may be hammermilled. One or more of the components may be hammermilled before being combined with any of the other components. The process produces a loose material blend, shown for example in FIGS. 2A and 2B. The loose blend may be packaged, such as in a bale, non-limiting example of which is shown in FIG. 6.

Figure 1:
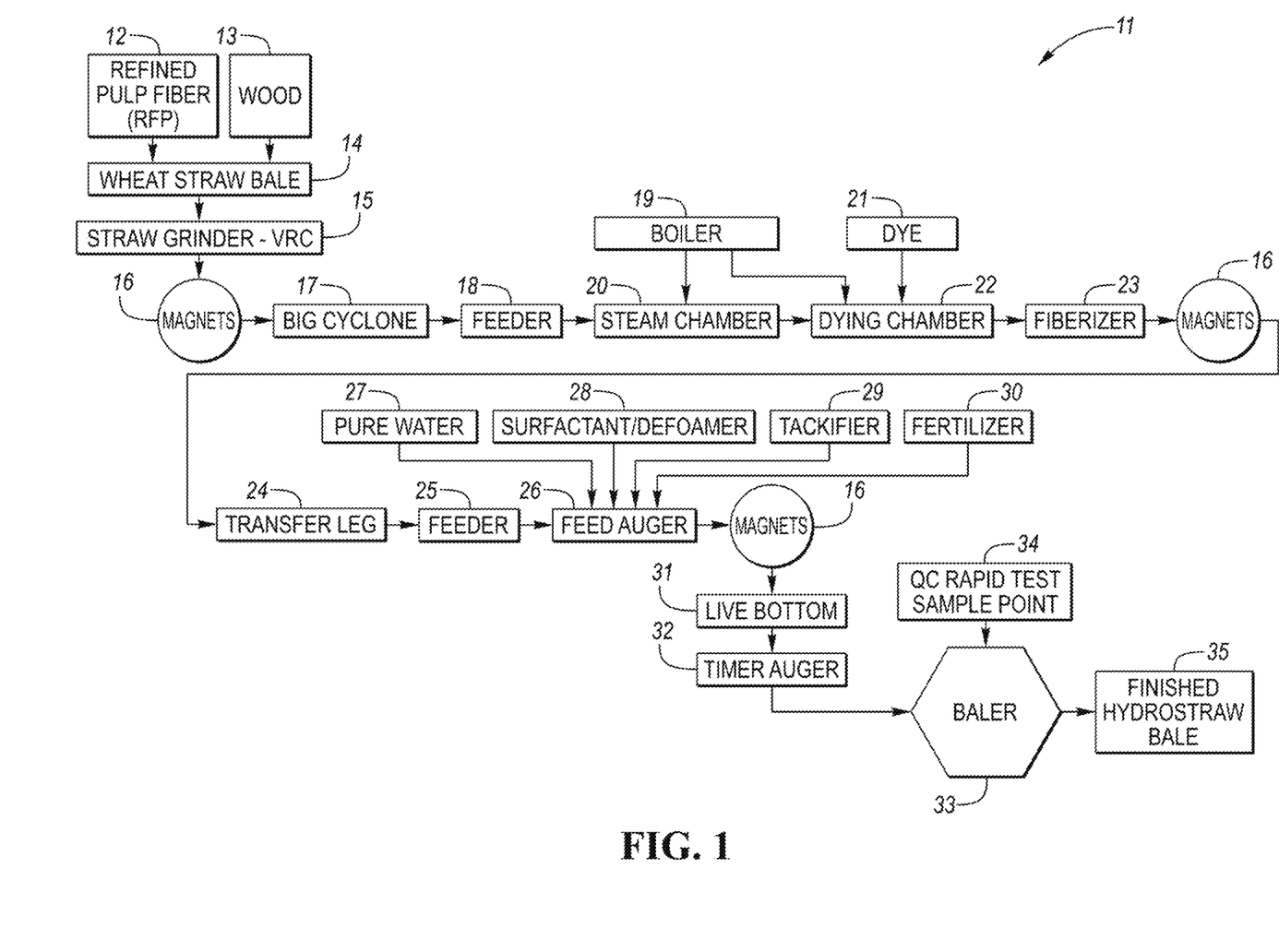
FIG. 1 is a schematic flowchart of a non-limiting example method of producing the herein-disclosed composition.

FIG. 1 details a schematic flowchart illustrating the manufacturing process 11 for creating the composition. Refined pulp fiber 12, fibrous wood components 13, and fibrous straw 14 may be processed in a grinder 15 by grinding, milling, blending, mixing, the like, or a combination thereof to produce a ground material or mixture. The initial fibrous wood components input may be pre-dyed. The mixture may exit the grinder 15 and may be transported to a feeder 18. The mixture, prior to reaching the feeder 18, may pass through one or more magnetic devices 16 to remove metallic debris, and/or a cyclonic separator 17 to remove dust. The mixture may then pass through a steam chamber 20, a dyeing chamber 22, or both, each being connected to a boiler 19. A dye or pigment 21 may be fed into the dyeing chamber 22 to dye the mixture. The mixture may subsequently enter a fiberizer 23, where the mixture fibers, refiner pulp fiber, fibrous wood components, fibrous straw, additional materials, or a combination thereof, are further disrupted and opened to create increased surface area. The mixture may pass through one or more additional magnetic devices 16 to remove metallic debris. The mixture may subsequently then enter a transfer leg 24 and travel to the feed auger 26 via a feeder 25.

While the feed auger 26 moves the mixture, additional materials disclosed herein may be added. The additional materials may include materials mentioned above, water 27, surfactant/defoamer 28, tackifier 29, fertilizer 30, the like, or a combination thereof. The processed mixture may then pass through another magnetic device(s) 16 to remove any metallic debris.

The processed mixture may be held in a live bottom hopper 31. The live bottom hopper 31 may hold the fully processed and treated composition. The live bottom hopper 31 may operate in conjunction with a timed auger 32 that feeds controlled amounts of mulch to a baler 33. The baler 33 compresses the composition from the timed auger 32 into bales of a desired size. A sample may be obtained from the baler 33 at this point 34 for a rapid quality control test. Finished bales 35 may exit the baler.

Alternatively, the refined pulp fiber 12, fibrous wood components 13, and fibrous straw 14 may be processed in a grinder 15 by grinding, milling, blending, mixing, the like, or a combination thereof to produce a ground material or mixture. The mixture may be transported to a feeder 18. The mixture may then pass through a steam chamber 20 connected to a boiler 19 prior to entering the fiberizer 23. Additional materials, which may include water 27, surfactant/defoamer 28, tackifier 29, and/or other materials described herein, may be added to the mixture in the feed auger 26. The processed mixture may subsequently pass through magnetic device(s) 16 and/or cyclone(s) to remove metallic debris, dust, or both. The fully processed and treated mulch may be held in a live bottom hopper 31, which operates in conjunction with a timed auger 32 that feeds controlled amounts of mulch to a baler 33. The baler 33 may compress the composition from the timed auger 32 into bales of a desired size. A sample of the composition may be obtained from the baler 33 for a rapid quality control test. Finished bales 35 may exit the baler 33.

The composition may have beneficial properties when compared to prior compositions. For example, the composition may provide a water holding capacity (WHC) equal to or better than industry standards. The water holding capacity (WHC) of the composition may be measured by ASTM D7367-14, a standard test method for determining water holding capacity of fiber mulches for hydraulic planting. According to ASTM D7367-14, the water holding capacity (WHC) of the composition may be about 400-1000, 500-900, or 600-800 wt. %, based on the total weight of the composition.

The composition may advantageously provide balanced air and water holding capacity equal to or better than industry standards. The free water of the composition may be about 50-120, 55-110, or 60-102 ml. The free water of the composition may be about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, or 120 ml. The free water refers to how much water is available to pour off from the mulch after it has been mixed with the suggested amount of water to create a slurry, meaning how much excess water is available from the slurry.

The pH of the composition may be about 5.0-7.0, 5.2-6.5 or 5.2-5.8. The pH of the composition may be about 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, or 7.0. The pH may be greater than 5. pH is relevant for plant growth/nutrient uptake of the plants growing in the mulch.

The electroconductivity (EC) of the composition may be about 0.20-0.90, 0.55-0.85, or 0.60-0.80 mmhos/cm. The EC of the composition may be about 0.2, 0.25, 0.3, 0.35, 0.4, 0.45, 0.5, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, or 0.90. The EC may be greater than about 0.25, 0.40, or 0.55 mmhos/cm.

The loose bulk density of the composition may be about 4.0-8.0, 5.0-67.0, or 5.5-6.5 lb/ft$^3$. The loose bulk density of the composition may be about 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, or 8.0 lbs/ft$^3$.

Advantageously, the composition may be seed and/or weed free in accordance with test method SOP-G-210. The composition may be substantially sterile.

As was stated above, the composition may be used as a stand-alone mulch composition or growing medium. Alternatively, the composition may be added to a conventional mulch composition, growing medium, growing mix, or substrate to replace at least partially one or more components. The composition may displace at least a portion of at least one of peat, composted pine bark, perlite, vermiculite, sand, rock wool, compost, animal manure, rice hulls, hardwood bark, softwood bark, coir, paper, sawdust, other organic materials such as composted organic matter, the like, or a combination thereof in a mix. The portion may be about 1-99, 5-90, or 10-80 wt. or vol. % of a mix, based on the total weight or volume of the mix. The composition may displace at least about 1, 5, 10, 15, 20, 25, 30, 35, 40, 45, 50, 55, 60, 65, 70, 75, 80, 85, 90, 95, or 99 wt. or vol. % of at least one of peat, composted pine bark, perlite, vermiculite, sand, rock wool, compost, animal manure, rice hulls, hardwood bark, softwood bark, coir, paper, sawdust, other organic materials such as composted organic matter, the like, or a combination thereof in the mix, based on the total weight or volume of the mix.

The composition may be also used in hydraulic applications. The hydraulically-applied mulch composition presents an effective solution for seed establishment, restoration of vegetation, and erosion control. The hydraulically-applied mulch composition may bond directly to soil while protecting seed, thus sheltering seedlings and/or plants from wind, heavy rain, and other environmental conditions while allowing seed germination and plant growth. The hydraulically-applied mulch composition may be used to secure statically-compromised slopes, stabilize highly erodible soil, reintroduce native species of plants, the like, or a combination thereof. The hydraulically-applied mulch composition may be used alone or in combination with other erosion-control methods. The hydraulically-applied mulch composition may be used during highway projects, recreational projects such as golf courses, in mine reclamation areas, in industrial or other applications.

The hydraulically-applied mulch composition may be applied to a site at once or in a plurality of stages. The composition may be further modified to form a slurry, which may be hydraulically applied. The slurry may include the composition, water, and optionally seed, chemical binders, natural gums, interlocking fibers, and/or other components named herein in a tank of a hydro-spraying machine or another suitable equipment. The seed may contain one species or comprise a mix of species such as native or non-native grasses, wildflowers, forbs, or other desirable species. The mixing may continue until all fiber of the composition is substantially broken apart and hydrated. When proper viscosity and activation of bonding additives is achieved, additional components named above or other components may be added. The hydrated composition may be then applied onto the site from a suitable equipment such as a hydro-spraying machine with a fan-type nozzle. Immediately after application, the composition bonds directly to the soil and provides protection for dormant seed, minimizes soil loss, and assists in fast establishment of vegetation at the application site.

EXAMPLES

Examples 1-5 and Comparative Examples C1-C5

Examples 1-5, each including fibrous straw, refined pulp fibers, and fibrous wood components described herein were prepared according to a method described above. Examples 1-5 were compared to Comparative Examples C1-C5 Hydra-Fiber® Ultra or HF160WB, including wood and bark fiber, more specifically having about 16% of fibers/10 g having a size sufficient to remain of sieve #8. Electrical conductivity and pH of Examples 1-5 and C1-C5 were measured and are noted in Table 3 below. In Table 3, pH$_i$ designates the initial pH measurement, whereas pH$_{15}$ and pH$_{30}$ designate measurements taken 15 and 30 minutes after the initial measurement respectively. EC, measured in mmhos/cm, denotes electrical conductivity. Density is measured in lb/ft$^3$. Free water is measured in milliliters.

As can be observed from Table 3, the composition disclosed herein has a higher loose bulk density than the HF160WB which is beneficial for erosion control performance. Also beneficial for erosion control is the increased water holding capacity of the currently-disclosed composition, demonstrated by the free water test.

TABLE 3

Physical properties of Examples 1-5 and Examples C1-C5

| Tested Property | Example No. - Straw-based Composition | | | | | Comparative Example - HF160WB | | | | |
| --- | --- | --- | --- | --- | --- | --- | --- | --- | --- | --- |
| | 1 | 2 | 3 | 4 | 5 | C1 | C2 | C3 | C4 | C5 |
| pH$_i$ | 5.8 | 5.2 | 5.3 | 5.6 | 5.6 | 3.8 | 4.1 | 3.7 | 3.7 | 3.7 |
| pH$_{15/30}$* | 5.4 | 6.0 | 6.1 | 6.3 | 6.4 | 4.1 | 3.8 | 3.7 | 3.7 | 3.7 |

TABLE 3-continued

Physical properties of Examples 1-5 and Examples C1-C5

| Tested Property | Example No. - Straw-based Composition | | | | | Comparative Example - HF160WB | | | | |
|---|---|---|---|---|---|---|---|---|---|---|
| | 1 | 2 | 3 | 4 | 5 | C1 | C2 | C3 | C4 | C5 |
| EC [mmhos/cm] | 0.67 | 0.68 | 0.83 | 0.57 | 0.77 | 0.12 | 0.11 | 0.09 | 0.09 | 0.09 |
| $EC_{15/30}$** [mmhos/cm] | 0.98 | 1.06 | 0.92 | 0.22 | 1.02 | 0.11 | 0.09 | 0.09 | 0.08 | 0.09 |
| Density [lb/ft³] | 5.39 | 5.49 | 5.45 | 5.74 | 5.68 | 1.50 | 1.60 | 1.55 | 1.65 | — |
| Free Water [ml] | 65 | 70 | 75 | 100 | 70 | 140 | 135 | 130 | 135 | 150 |

*$pH_{15}$ for the straw-based composition and $pH_{30}$ for the HF160WB
**$EC_{15}$ for the straw-based composition and $EC_{30}$ for the HF160WB While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A mulch composition comprising:
a blend of about 50-85 wt. % fibrous straw, based on the total weight of the mulch composition;
about 10-30 wt. % refined pulp fibers, based on the total weight of the mulch composition; and
about 10-40 wt. % fibrous wood components, based on the total weight of the mulch composition,
the blend having about 10-15 wt. % of particles having particle size of 2360 μm or greater.

2. The mulch composition of claim 1, wherein the fibrous wood components are hammermilled.

3. The mulch composition of claim 1, wherein the fibrous straw comprises wheat straw.

4. The mulch composition of claim 1, wherein the fibrous straw comprises Kentucky blue grass straw, alfalfa, or both.

5. The mulch composition of claim 1, wherein the mulch composition includes about 7-10 wt. % of particles having a size sufficient to remain on sieve 100.

6. The mulch composition of claim 1, wherein the fibrous wood components include a surfactant.

7. The mulch composition of claim 1 further comprising at least one of fertilizer(s), macronutrient(s), micronutrient(s), mineral(s), binder(s), natural gum(s), interlocking fiber(s), biostimulant(s), ceramic particle(s), and combinations thereof.

8. The mulch composition of claim 1, wherein the mulch composition includes about 65-75 wt. % fibrous straw, about 15-25 wt. % refined pulp fibers, and about 15-25 wt. % fibrous wood components, based on the total weight of the mulch composition.

* * * * *